Figure 1:
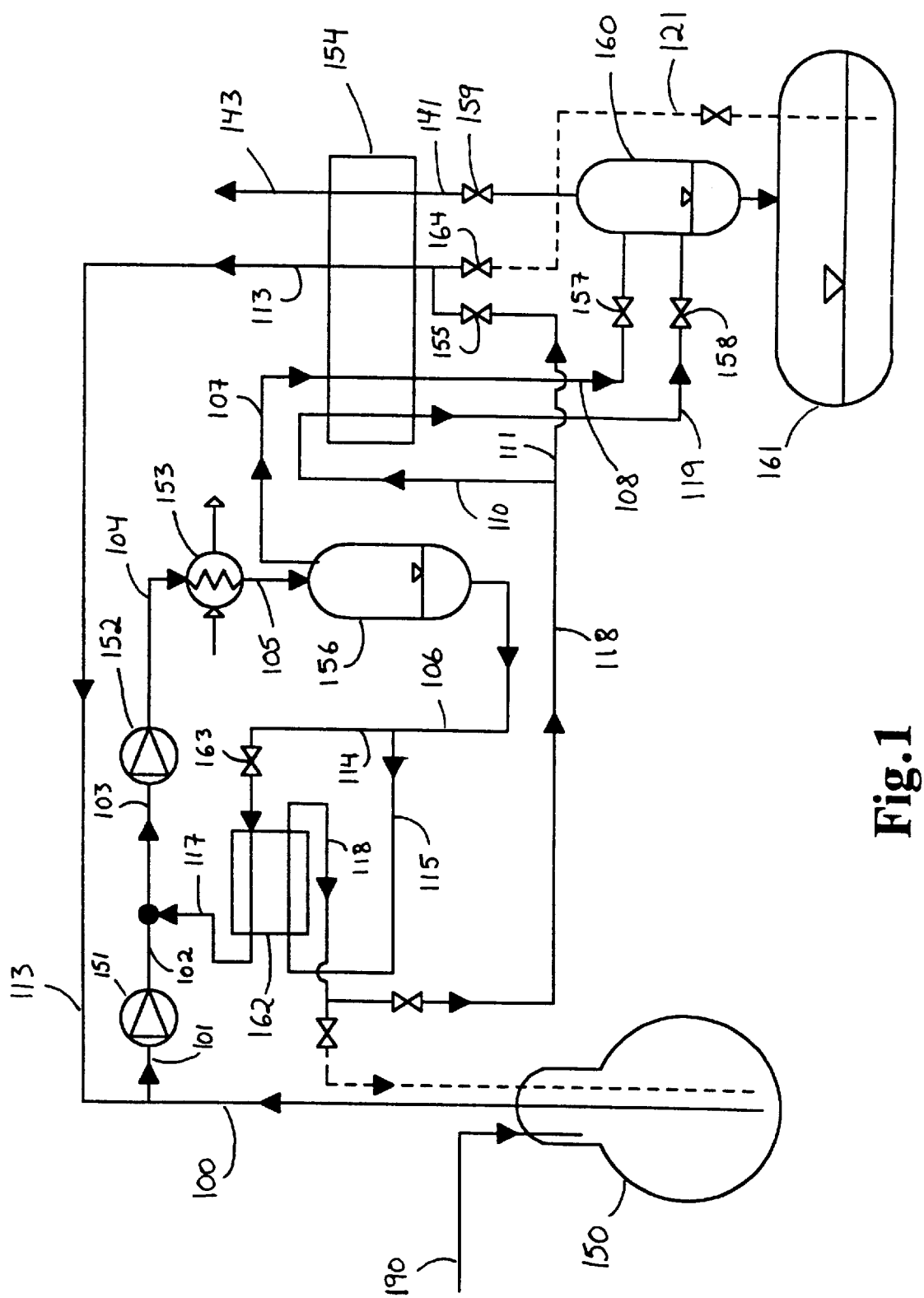

United States Patent [19]
Brendeng

[11] Patent Number: 5,860,294
[45] Date of Patent: Jan. 19, 1999

[54] RECONDENSATION OF GASEOUS HYDROCARBONS

[75] Inventor: Einar Brendeng, Trondheim, Norway

[73] Assignee: Sinvent AS, Trondheim, Norway

[21] Appl. No.: 849,534

[22] PCT Filed: Jan. 11, 1996

[86] PCT No.: PCT/NO96/00005

§ 371 Date: Jul. 28, 1997

§ 102(e) Date: Jul. 28, 1997

[87] PCT Pub. No.: WO96/22221

PCT Pub. Date: Jul. 25, 1996

[30] Foreign Application Priority Data

Jan. 19, 1995 [NO] Norway ..................................... 950204

[51] Int. Cl.[6] .................................................. F25J 1/00
[52] U.S. Cl. ............................................. 62/619; 62/48.2
[58] Field of Search ...................... 62/48.2, 619

[56] References Cited

U.S. PATENT DOCUMENTS

| | | | |
|---|---|---|---|
| 3,271,965 | 9/1966 | Maher et al. | 62/48.2 |
| 4,249,387 | 2/1981 | Crowley | 62/48.2 |
| 4,645,522 | 2/1987 | Dobrotwir | 62/619 |
| 5,036,671 | 8/1991 | Nelson et al. | 62/48.2 |
| 5,176,002 | 1/1993 | O'Brien et al. | 62/48.2 |

*Primary Examiner*—Ronald Capossela
*Attorney, Agent, or Firm*—Dennison, Meserole, Pollack & Scheiner

[57] ABSTRACT

A method for condensation of gaseous hydrocarbons from a mixture of inert gas and gaseous hydrocarbons, particularly as found in storage tanks of an LPG/LEG ship. According to the method, the condensate and the cargo gas composition are heat exchanged with a part of its condensate, and with a cargo gas/inert gas mixture, which is to be released to the atmosphere or burned, in a separate condensation step.

6 Claims, 2 Drawing Sheets

RECONDENSATION OF GASEOUS HYDROCARBONS

The invention concerns a method for recondensation of gaseous hydrocarbons from mixtures of inert gases and gaseous hydrocarbons, as stated in the introductory of claim 1.

BACKGROUND

Gas present in tanks in LPG/LEG ships at reloading is removed by means of nitrogen or an inert gas. The method which is used presently involves release of the off-gas to atmosphere. This off-gas constitutes a loss of about 250,000 tons of hydrocarbons per year, mainly propane and butane.

NO Patent Application 932417 discloses a method for recovering a portion of this off-gas by condensing the off-gas in heat exchange with liquid nitrogen, whereupon the evaporated nitrogen is used in the removal of gas from the tanks. In relation to the gas removed the consumption of nitrogen with this method is unnecessary high.

U.S. Pat. No. 5,176,002 describes a process for recovery of vapor released during filling of hydrocarbons in storage tanks. Inert gas is supplied to the tank and intermixed with hydrocarbon vapor to form a non-combustible composition. The composition is thereafter subjected to a two-step compression, and a separation process to condense and separate the hydrocarbon vapor from the inert gas. This process involves the use of a closed coolant circuit in the separation/condensation step.

OBJECT

The object of the invention is to provide a method for recondensation of off-gas in connection with gas removal from gas tanks to avoid increased nitrogen consumption during gas removal, and simultaneously recover in liquid form a substantial part of the hydrocarbon content of the off-gas.

THE INVENTION

This object is achieved by a method according to the characterizing section of patent claim 1. Further favorable features appear from the dependent claims.

According to the present method, the condensate and the cargo gas composition are heat exchanged with a part of its condensate and cargo gas/inert gas mixture, which is to be released to the atmosphere or burned, in a separate condensation step.

More particularly, after compression in at least one step the gas phase from the gas tank is partly condensed in the recondensation plant cargo condenser by means of cooling water or another suitable coolant. The mixture comprising condensate and cargo gas/inert gas is then conveyed to a first phase separator, e.g. the ordinary liquid collector in the recondensation plant.

In accordance with the invention the uncondensed part of the cargo gas/inert gas composition is conveyed from the top of the first phase separator to a separate condensation or heat exchange step. It is then cooled by expanding a part of the condensate from the first phase separator, after cooling in the ordinary intermediate cooler in the recondensation plant, into one side of a separate heat exchanger. After evaporation and superheating in the separate heat exchanger, the gaseous cargo gas is led back to the suction end of the compressor in the recondensation plant.

In the separate heat exchange step the cargo gas component in the cargo gas/inert gas composition is subjected to further condensation, whereupon the resulting condensate/gas composition is expanded to a lower pressure and led into a second phase separator, e.g. constructed to serve as a storage tank for collected cargo gas condensate. Inert gas from the second phase separator including some cargo gas is expanded into a separate section in the separate heat exchange step and is heated by heat exchange with the cargo gas/inert gas composition from the first separator and released to atmosphere, optionally after combustion in a flare.

The remaining part of the condensate from the first phase separator or the liquid collector is also conveyed to the second phase separator or storage tank.

In this way it is possible to obtain a high degree of recovery, typically up to 93% of the original content of cargo gas in the tank, by means of a simple and cost effective process. The term 'cargo gas' is intended herein to include hydrocarbon residue from gas tanks, such as propane, mixtures of different hydrocarbons, or evaporated hydrocarbons, e.g. from chemical tankers.

The separate heat exchange step may be provided as an arrangement of several heat exchanger units, but in view of area requirements, complexity and investment it is preferred to use a multi-flow heat exchanger, e.g. in the form of a plate-fin exchanger.

Figure 2:
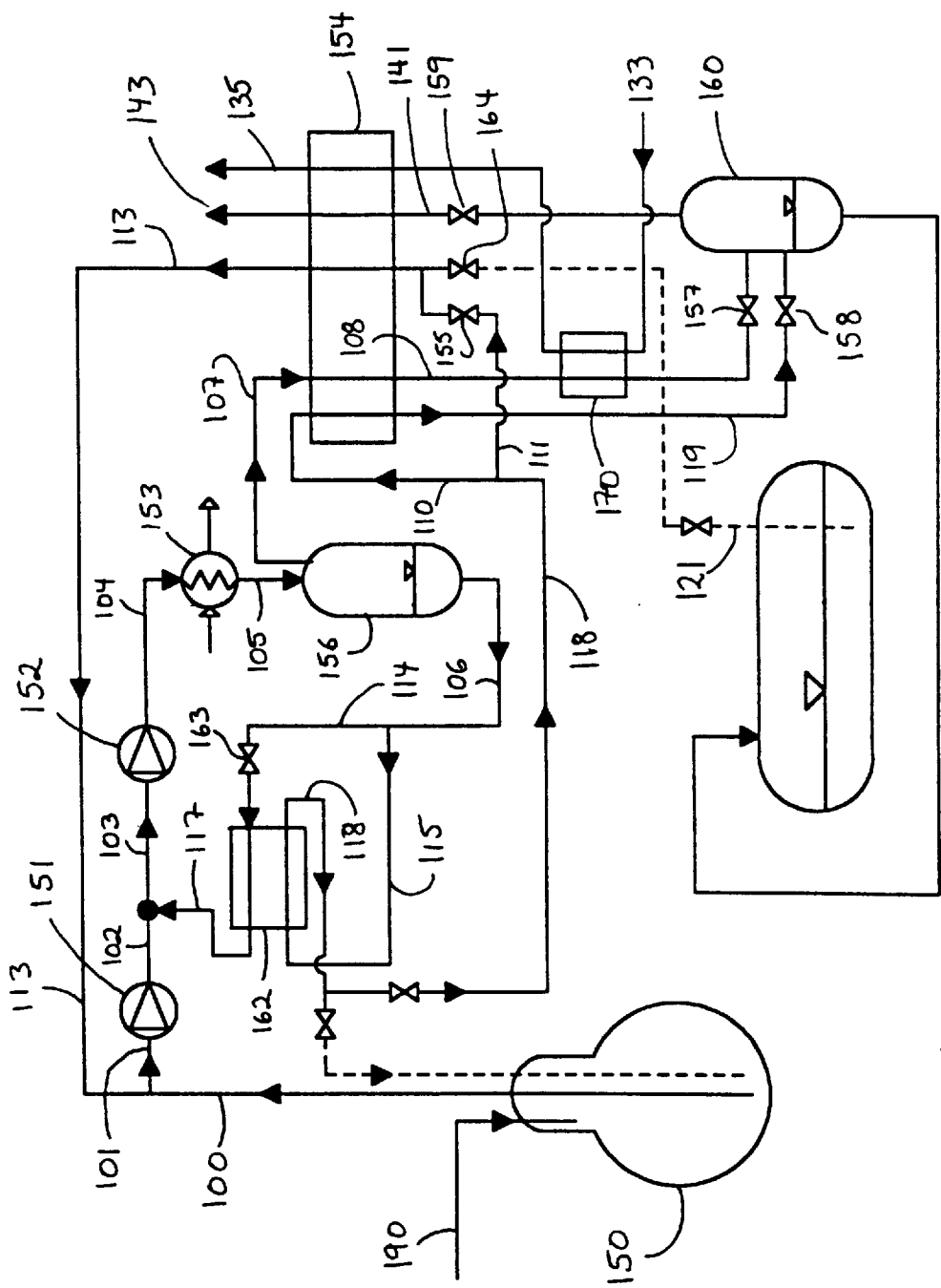

In the following, the method is illustrated in further detail by means of drawings, in which FIG. 1 illustrates a simplified flow diagram for condensation of hydrocarbon gas and a mixture of inert gas and hydrocarbon gas, and FIG. 2 shows an alternative embodiment of the method illustrated in FIG. 1.

According to FIG. 1 the storage tank 150 for LPG/LEG gas is supplied with an inert gas from line 190 whereby the off-gas is displaced and pushed out of the storage tank via line 100 (and later on in the recondensation course together with the return flow 113 from the recondensation plant) and line 101 to a first compression step 151. The compressed off-gas 102 is then cooled in an intermediate cooler, here indicated as an ordinary injection intermediate cooler by means of flow 117. The cooled off-gas is conveyed from the injection intermediate cooler via line 103 to a second compression step 152, optionally to the highest allowable pressure. It is then conveyed via line 104 to the cargo condenser 153, in which the superheated gas is cooled and condensed partially in heat exchange with a cryogenic coolant or an ordinary cooling medium (for example seawater).

At the outlet of the condenser 153 a part of the hydrocarbon content will be condensed, dependent on the temperature in flow 105 out of the heat exchanger and on the inert gas content.

The partially condensed off-gas is then conveyed to a first phase separator 156 via line 105, in which inert-containing gas is separated and conveyed via line 107 to a separate heat exchanger 154 and heat exchanged to a part of its own condensate from line 106 after the latter has been cooled in the intermediate cooler 162. In the separate heat exchanger 154 further cargo gas is condensed from the gas flow from the top of the first phase separator. The resulting composition comprising condensate and inert gas/cargo gas is then withdrawn from the heat exchanger 154 in flow 108 and expanded in a throttle valve 157 to a lower pressure and transported to a second phase separator 160.

The condensate in line 106 from the first phase separator 156 is split into two flows: (i) flow 114 which is expanded to a pressure at or just above the pressure in the second compressor step in throttle valve 163 and transported to the intermediate cooler 162 and then to the suction end of the second compression step 152, and (ii) flow 115, which is also led to the intermediate cooler 162 and cooled by heat exchange with evaporating condensate in the parallel expanded flow 114, and the cooled condensate component flow is then conveyed to the separate heat exchanger 154 via line 118 and split into flow 111 and flow 110. Flow 111 is expanded in valve 155 and supplied to the separate heat exchanger 154 in which the condensate evaporates and is transported via line 113 back to the suction end of the first compression step 151. Second flow 110, is optionally cooled in the separate heat exchanger 154 and is then conveyed to the second phase separator 160 after expansion in valve 158.

The liquid component from the second phase separator 160 is supplied to a storage tank 161. The gas component from the second phase separator is expanded in valve 159 and supplied to the separate heat exchanger 154 in which the hydrocarbon component(s) evaporate and cools condensate and gas fraction from the first phase separator 156 from flows 110 and 107, respectively.

The gas fraction from the second phase separator 160 is transported out of the separate heat exchanger 154 and to atmosphere in line 143 or to a flare for combustion.

During the first period of the gas removal the off-gas from the cargo tank in for example LPG/LEG ships will be pure, i.e. free from inert gas, and the conventional recondensation plant may be used in a manner known per se directly for recovery of the off-gas, whereupon the condensate may be conveyed to a storage tank or similar.

After the bulk of the cargo gas has been removed and collected the remaining gas phase from the gas container exhibits a gradually decreasing content of hydrocarbon gas as the off-gas is supplied to the recondensation plant. Having an [a] inert gas content of above 10% in the cargo gas (dependent on medium, temperature and pressure in the process) the quantity of condensed cargo gas from the first phase separator 156 will become too low to fulfill the demand on condensed cargo gas in line 111 for cooling of the gas fraction 107 from the first phase separator and component flow 110 of condensate from the same. At the terminal part of the recondensation course, condensed cargo gas from the storage tank 161 will have to be transported from the storage tank 161 via line 121 to the throttle valve 164 together with the condensate flow 111 from the first phase separator 156 throttled at 155. The actual or maximum degree of recovery of cargo gas will, however, be a balance between time taken and the desired degree of recovery. The higher the degree of recovery, the longer processing time will be needed. The maximum degree of recovery of 93% stated above should not be interpreted as absolute, but merely a practical maximum limit provided as a result of a time and cost evaluation.

FIG. 2 shows an alternative embodiment of the present method in which the hydrocarbon/inert gas flow 108 out of the separate heat exchanger 154 is additionally cooled in a further heat exchanger 170 by heat exchange with for example a disposable coolant 133, such as liquid nitrogen, carbon dioxide or a cryogenic liquid cooled with liquid carbon dioxide. After this optional additional cooling the hydrocarbon/inert gas flow is expanded in throttle valve 157 and supplied to the second phase separator 160. In this way the degree of recovery may be further increased, and the concentration of hydrocarbons in off-gas-flow 143 to atmosphere or to flare can be decreased accordingly.

I claim:

1. Method for condensation of gaseous hydrocarbons from a mixture of inert gas and gaseous hydrocarbons, comprising the steps of:

combining the mixture with a substantially pure hydrocarbon vapor, compressing the combination in at least one step and then partially condensing the compressed combination in a heat exchanger by means of a separate coolant, and condensing compressed off-gas partially by heat exchange with the separate coolant in a first condensation step and separating condensed liquid from gas in a first phase separator (156);

dividing liquid flow from the first phase separator into first and second component flows, inter-heat exchanging the second component flow in an intermediate cooler by expanding at the first component flow and evaporating the same by heat exchange with the second component flow, thus producing a gaseous flow substantially comprising gaseous hydrocarbons and a cooled flow substantially comprising cooled or sub-cooled hydrocarbon condensate; and condensing the separated gas from the first phase separator in a second condensation step by heat exchange with a) at least a part of cooled condensate from the first phase separator by expanding the cooled condensate to a lower pressure and evaporating the cooled, expanded condensate by heat exchange with the separated gas from the first phase separator, and b) hydrocarbon-containing inert gas from a second phase separator, said second phase separator being supplied with a mixture of condensate and hydrocarbon/inert gas in line from the partially condensed flow.

2. The method of claim 1, additionally comprising splitting the cooled condensate flow from the first phase separator into first and second flows, and cooling the condensate in the first flow by heat exchange with the second condensate flow expanded to said lower pressure, and supplying the cooled condensate to the second phase separator or a storage tank.

3. The method of claim 1, additionally comprising performing an additional cooling of the condensate and hydrocarbon/inert gas composition in an additional heat exchanger by means of a disposable coolant.

4. The method of claim 1, additionally comprising performing the heat exchange in said separate condensation step in a separate heat exchanger.

5. The method of claim 3, wherein the disposable coolant comprises liquid nitrogen, carbon dioxide or a cryogenic liquid cooled by liquid carbon dioxide.

6. The method of claim 1, wherein the gaseous hydrocarbons originate from a space above LPG or LEG in a storage tank, and the inert gas is supplied to the tank to remove the gaseous hydrocarbons therefrom, thereby forming the mixture.

* * * * *